May 11, 1965  F. P. GOOCH  3,182,802
CENTRIFUGAL SEPARATOR HAVING A WASHING MEANS
Filed Feb. 12, 1962
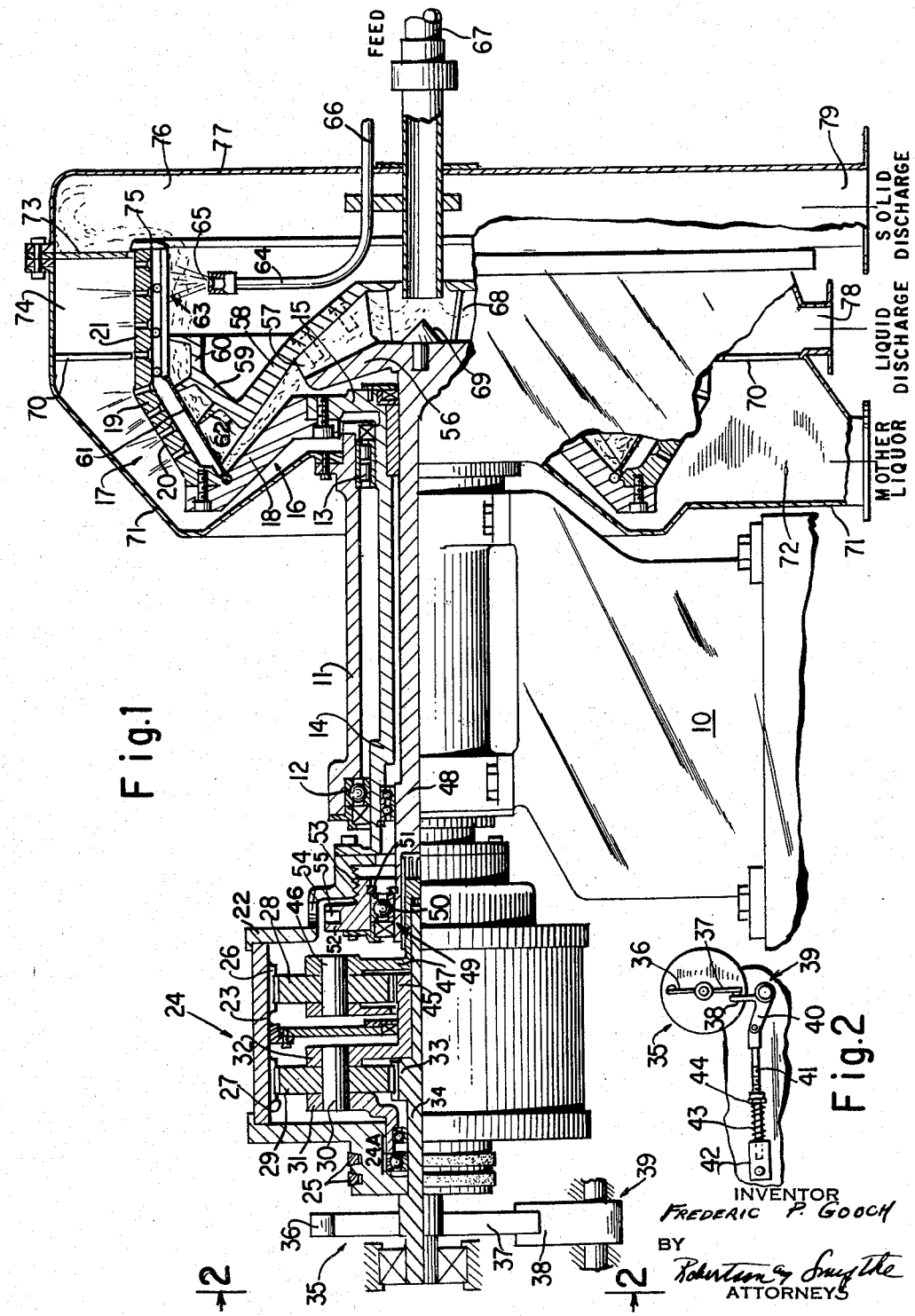
INVENTOR
FREDERIC P. GOOCH
BY
Robertson & Smythe
ATTORNEYS

3,182,802
CENTRIFUGAL SEPARATOR HAVING A WASHING MEANS

Frederic P. Gooch, North Miami Beach, Fla., assignor to Ametek, Inc., New York, N.Y., a corporation of Delaware
Filed Feb. 12, 1962, Ser. No. 172,731
2 Claims. (Cl. 210—212)

The present invention relates to continuously fed centrifugal separators, and particularly to such a separator for use in processes requiring the separation of crystalline solids from a mother liquor, as well as washing and drying such crystals.

The principal object of the invention is to provide a continuously fed centrifugal separator having the capability of dewatering crystalline solids as well as washing said solids.

Another object of the invention is to provide such a centrifugal separator in which the material to be treated is fed into the separator along its axis of rotation from which point it is accelerated and fed to the smaller diameter end of a conical perforated basket.

Still another object of the invention is to provide such a separator having a perforated walled basket that is partly conical and partly cylindrical in form.

Still another object of the invention is to provide such a separator in which the mother liquor, the wash water and the dry crystals may be separately collected.

Still another object of the invention is to provide such a separator in which a scroll conveyor is adjustably mounted within a perforated walled basket having conical and cylindrical portions.

In one aspect of the invention, a basket having one open end, a perforate side wall and an imperforate end wall may be connected to a tubular member adapted to be rotated about a horizontal axis. The perforate side wall may include a conical portion and a cylindrical portion.

In another aspect of the invention, a scroll conveyor may include a conical portion spaced from the end wall of the basket forming an annular passage therebetween, as well as conical and cylindrical portions spaced from the conical and cylindrical portions of the perforated side wall of the basket. A scroll may be fixed to the outer periphery of the conical and cylindrical portions of the conveyor and may lie within the annular space between them and the corresponding portions of the perforate side wall of the basket.

In still another aspect of the invention, the length of the cylindrical portion of the conveyor may be less than the cylindrical portion of the perforate basket, providing an exposed portion of said cylindrical perforated portion against which may be directed one or more jets of liquid for washing the crystalline solids as they pass thereacross prior to being forced into a solids collecting chamber that may be provided at the exit end of the scroll conveyor. Suitable sealing partitions may be provided between the end of the conveyor and the solids collecting chamber, as well as between the conical and cylindrical portions of the perforate side wall of the basket. This latter partition may form two collecting chambers, one for collecting the mother liquor while the other collects the washing liquid.

In still another aspect of the invention, the scroll conveyor may be attached to a drive shaft concentrically arranged with the tubular shaft supporting the basket. The two concentric shafts may be connected together through a speed reduction unit which, in the embodiment disclosed, is shown as an epicyclic gear box arrangement for providing a differential in speed between the basket and the scroll conveyor while both rotate in the same direction.

In still another aspect of the invention, an adjustable bearing arrangement may be provided between the gear box and the drive shaft for the scroll conveyor, to effect adjustment of the scroll feeding means relative to the inner wall of the basket.

The above, other objects and novel features of the invention will become apparent from the following specification and accompanying drawing which is merely exemplary.

In the drawing:

FIG. 1 is a sectional elevational view of a centrifugal separator to which the principles of the invention have been applied; and FIG. 2 is a view taken along line 2—2 of FIG. 1.

Referring to FIG. 1, the principles of the invention are shown as applied to a centrifugal separator including a base 10 having a cylindrical housing 11 integral therewith, which latter supports axially aligned anti-friction bearings 12 and 13. A tubular shaft 14 is journaled within bearings 12 and 13, and its one end may be provided with a flange 15 to which may be bolted or otherwise secured an imperforate end 16 of a basket 17. The end wall 16 may include a conical portion 18 for a purpose to be described later. The side wall 19 of the basket 17 may be perforated and may include a conical portion 20 and a cylindrical portion 21 for a purpose to be described later.

The opposite end of tubular shaft 14 may be connected to a disk member 22 that may be attached to the outer housing 23 forming a reactor element of an epicyclic gear box. The reactor element may include internal gears 26 and 27 that mesh with planet gears 28, 29. The housing 23 may be rotated by a sheave 24A through V-belts 25 that are connected to a prime mover (not shown).

The planet gear 29 is journaled on a pin 30 mounted in arm means 31, 32, and it meshes with a sun gear 33 formed on a shaft 34 that is normally held against rotation by an overload releasing means 35. Referring to FIG. 2, the overload means 35 may comprise radially extending arms 36, 37, the ends of which are adapted to cooperate with one arm 38 of a bell crank 39, the other arm 40 of which is pivoted to a threaded rod 41. The end of rod 41 opposite that pivoted to arm 40 is connected to a toggle joint 42 that is under the effect of a spring 43, the force of which may be varied by a nut 44 on rod 41.

The arm means 32 may be journaled on shaft 34 and it may include a sun gear 45 that meshes with planet gears 28 that are journaled on pins 46 mounted in arm means 47. Arm means 47 may be splined to a shaft 48 that is mounted for axial movement and journaled in an antifriction bearing 49. The bearing 49 may include an inner race 50 fixed to shaft 48, and an outer race 51 mounted within a rotatable member 52 threaded into a portion 53 of disk member 22. A slot 54 may be provided within member 22 for receiving a tool that may be used to engage socket means 55 within member 52 for effecting its rotation which will cause axial movement of bearing 49 and with it shaft 48. Movement of shaft 48 axially will permit adjustment of the space between member 58 and conical portion 18 so as to adjust flow.

The end of shaft 48 opposite that which is splined to arm means 47 of the epicyclic gearing arrangement may be provided with a flange 56 having spaced, radial ribs or webs 57 to which may be attached a scroll supporting member 58 that forms with flange 56 and webs 57, radial passages for accommodating the flow of slurry therethrough that is fed to the separator. The member 58 may also include a conical portion 59 and a cylindrical portion 60. The construction and arrangement are such that the member 58 with its portions 59 and 60 form a passage for the flow of material to be treated to, and along the inner perforated wall 19 of the basket 17.

A screen 61 may cover the inner surface of the perforated wall 19. The screen 61 may be fabricated from triangular cross section bars arranged at right angles forming a predetermined size mesh. A scroll feeding element 62 may be spiraled around and fixed to the outer peripheral surface of the portions 59 and 60 of the scroll-supporting member 58. It is to be noted that the length of the cylindrical portion 60 is substantially less than that of the cylindrical portion 21, providing an exposed section 63 of the perforate wall 21 beyond the end of portion 60. A radial tube 64 having spraying jet 65 may be located in basket 17 within the exposed section 63. A line 66 may supply washing liquid to the tube 64 for washing the crystalline solids as they are forced across section 63 after leaving the scroll feeding element 62.

A feed line 67 may be located along the axis of rotation of the separator, and it continuously feeds the material to be treated into a chamber 68 formed between the support 58 and flange 56 where it is spread radially by a conical director 69 fixed to the end of shaft 48.

As the slurry reaches the chamber 68, it is shown radially outwardly and accelerated by the action of the vanes or webs 57 and enters the annular space between the basket 17 and the portions 59, 60 of member 58.

Partition 70 may surround the basket 17 and may be fixed to the wall of a housing 71 surrounding said basket. An outlet 72 may be provided for the chamber formed by partition 70 for draining the mother liquor extracted from the crystalline solids as they are conveyed past the perforated portion 20 of the basket 17.

Another partition 73 may surround the exit end of basket 17 and it may form a chamber 74 within which the washing liquid from jet 65 is collected after passing through the centrifuged crystalline solids as they are fed across the inner surface of the perforated portion 21. The partition 73 may cooperate with suitable sealing means such as a labyrinth packing and wall means 75 to prevent washing liquid from passing into a chamber 76 that is formed between the partition 73 and a cover 77.

An outlet 78 may be provided for the chamber 74, and a similar outlet 79 may be provided for chamber 76 for the passage of the washing water and dry washed crystalline solids, respectively.

Although the various features of the new and improved centrifugal separator have been described in detail to fully disclose one embodiment of the invention, it will be evident that changes may be made in such details and certain features may be used without others without departing from the principles of the invention.

What is claimed is:
1. In a centrifugal separator for separating material, a basket having an open end, an imperforate end and an outer perforate side wall, said perforate side wall having conical and cylindrical portions, said conical portion adjoining said imperforate end and being flared outwardly therefrom, and said cylindrical portion adjoining the outer end of said flared portion, a spiral like scroll conveyor mounted concentrically within said basket and having conical and cylindrical portions, the respective cylindrical portions and the respective conical portions of said basket and conveyor being spaced from and substantially parallel to each other, the length of the cylindrical portion of said conveyor being less than that of the cylindrical portion of said perforate side wall providing an exposed portion of said perforate side wall, means for directing a jet of washing liquid material toward said exposed portion of said perforate side wall, and means for rotating said basket and scroll conveyor at different rates of rotation relative to each other, means for adjusting said conveyor axially relative to said basket whereby the distance therebetween may be regulated, and means for introducing material to be separated into the basket whereby the material is caused to be moved by said scroll outwardly along said conical portions and thence axially along said cylindrical portions by increasing centrifugal force to effect washing and discharge.

2. In a centrifugal separator for separating material, a basket having an open end, an imperforate end and an outer perforate side wall, said perforate side wall having conical and cylindrical portions, said conical portion adjoining said imperforate end and being flared outwardly therefrom, and said cylindrical portion adjoining the outer end of said flared portion, a helical scroll conveyor mounted concentrically within said basket and having conical and cylindrical portions, the respective cylindrical portions and the respective conical portions of said basket and conveyor being spaced from and substantially parallel to each other, the length of the cylindrical portion of said conveyor being less than that of the cylindrical portion of said perforate side wall providing an exposed portion of said perforate side wall, means for directing a jet of washing liquid material toward said exposed portion of said perforate side wall, and means for rotating said basket and scroll conveyor at different rates of rotation relative to each other, means for adjusting said conveyor axially relative to said basket whereby the distance therebetween may be regulated means for feeding crystalline solids mixed with a mother liquor into said basket, a housing surrounding said basket, and separate chambers within said housing for collecting said mother liquor, said washing liquid, and the dry crystalline solids resulting from the material being moved by said scroll outwardly along said conical portions and thence axially along said cylindrical portions by increasing centrifugal force to effect washing and discharge.

References Cited by the Examiner
UNITED STATES PATENTS

| | | | |
|---|---|---|---|
| 1,218,024 | 3/17 | Wendell | 210—377 X |
| 1,336,722 | 4/20 | Behr | 210—78 X |
| 1,565,002 | 12/25 | Behr | 210—377 X |
| 1,589,097 | 6/26 | Behr | 210—369 X |
| 1,650,685 | 11/27 | Behr | 210—377 X |
| 1,903,795 | 4/33 | Rigler | 210—213 |
| 2,040,822 | 5/36 | Brewer | 210—380 X |
| 2,095,206 | 10/37 | Sharples | 210—380 X |
| 2,283,457 | 5/42 | Pecker | 210—374 |
| 2,600,372 | 6/52 | Milliken et al. | 233—7 |
| 2,649,816 | 8/53 | Kuster et al. | 233—7 X |
| 2,703,676 | 3/55 | Gooch | 233—7 |
| 2,727,629 | 12/55 | Hertrich | 210—374 X |
| 2,795,635 | 6/57 | McBride. | |
| 2,828,021 | 3/58 | Ruegg | 210—377 X |

FOREIGN PATENTS

| | | |
|---|---|---|
| 8,298 | 3/05 | Great Britain. |
| 260,315 | 5/13 | Germany. |
| 963,857 | 5/57 | Germany. |

GEORGE D. MITCHELL, *Primary Examiner.*

ROBERT F. BURNETT, HERBERT L. MARTIN,
*Examiners.*

UNITED STATES PATENT OFFICE
CERTIFICATE OF CORRECTION

Patent No. 3,182,802                         May 11, 1965

Frederic P. Gooch

It is hereby certified that error appears in the above numbered patent requiring correction and that the said Letters Patent should read as corrected below.

Column 3, line 26, for "shown" read -- thrown --; column 4, line 33, after "regulated" insert a comma.

Signed and sealed this 7th day of December 1965.

(SEAL)
Attest:

ERNEST W. SWIDER                          EDWARD J. BRENNER
Attesting Officer                            Commissioner of Patents